H. CHRISMAN.
METER.
APPLICATION FILED AUG. 29, 1910.

1,119,684.

Patented Dec. 1, 1914.
3 SHEETS—SHEET 1.

WITNESSES

INVENTOR
Horace Chrisman

H. CHRISMAN.
METER.
APPLICATION FILED AUG. 29, 1910.

1,119,684.

Patented Dec. 1, 1914.

WITNESSES

INVENTOR
Horace Chrisman
by Jno. T. Green
his Attorney in fact.

H. CHRISMAN.
METER.
APPLICATION FILED AUG. 29, 1910.
1,119,684.
Patented Dec. 1, 1914.
3 SHEETS—SHEET 3.
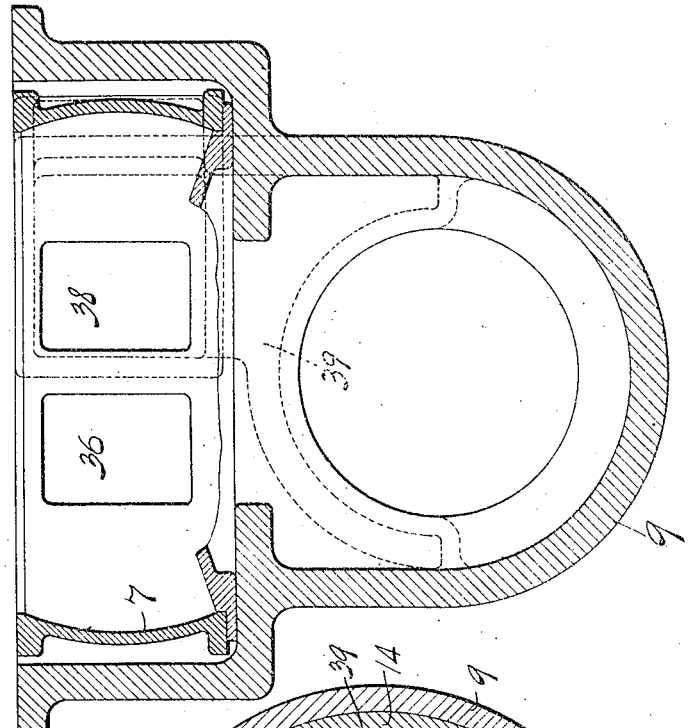
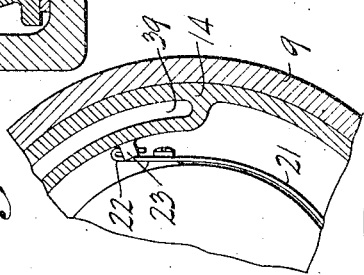
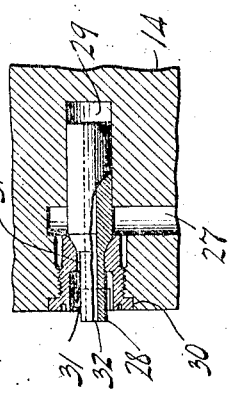
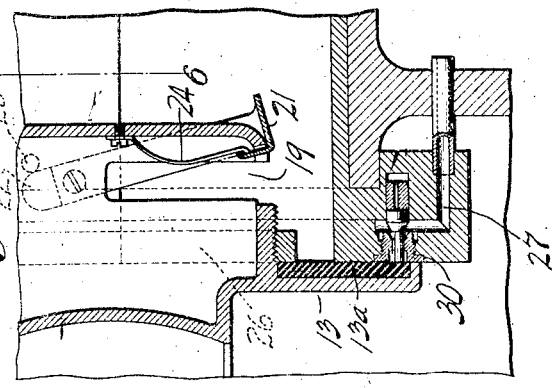
WITNESSES
INVENTOR
Horace Chrisman

UNITED STATES PATENT OFFICE.

HORACE CHRISMAN, OF EDGEWOOD PARK, PENNSYLVANIA, ASSIGNOR TO PITTSBURG METER COMPANY, A CORPORATION OF PENNSYLVANIA.

METER.

1,119,684. Specification of Letters Patent. Patented Dec. 1, 1914.

Application filed August 29, 1910. Serial No. 579,504.

*To all whom it may concern:*

Be it known that I, HORACE CHRISMAN, a citizen of the United States, and a resident of Edgewood Park, in the county of Allegheny and State of Pennsylvania, have made a new and useful Invention in Meters, of which the following is a specification.

This invention relates to meters and has for an object to produce an improved meter system for registering the small or normal flows and also the large or abnormal flows traversing a water main employed for ordinary distribution purposes and also for fire service.

A further object is to produce means for positively rendering one of the meters inoperative, while the other meter in such a system is operating.

A further object is to produce a meter system, employing a meter adapted to move from an operative to an inoperative position and vice versa, and in which improved means are employed for holding the meter in the operative position during normal flows.

These and other objects I attain by means of a meter system embodying the features herein described and illustrated.

In the drawings accompanying this application and forming a part thereof, Figure 1 is a plan view of a meter system embodying my invention, in which the meters, included in the system, are shown with the top covers removed and in which portions are shown broken away and in section for convenience of illustration.

Figure 3 is a fragmental sectional view along the line 2—2 of Figure 1 and shows, on an enlarged scale, the arrangement of a valve for closing the inlet port of the positive registering meter and also a drip or air valve.

Figure 4 is a fragmental section along the line 2—2 on still a larger scale and discloses the drip or air valve illustrated in Figure 3.

Figure 5 is a transverse section along the line 5—5 of Figure 1 and illustrates the arrangement of ports in the proportional meter.

Figure 6 is a fragmental section along the line 6—6 of Figure 3.

Figure 1:
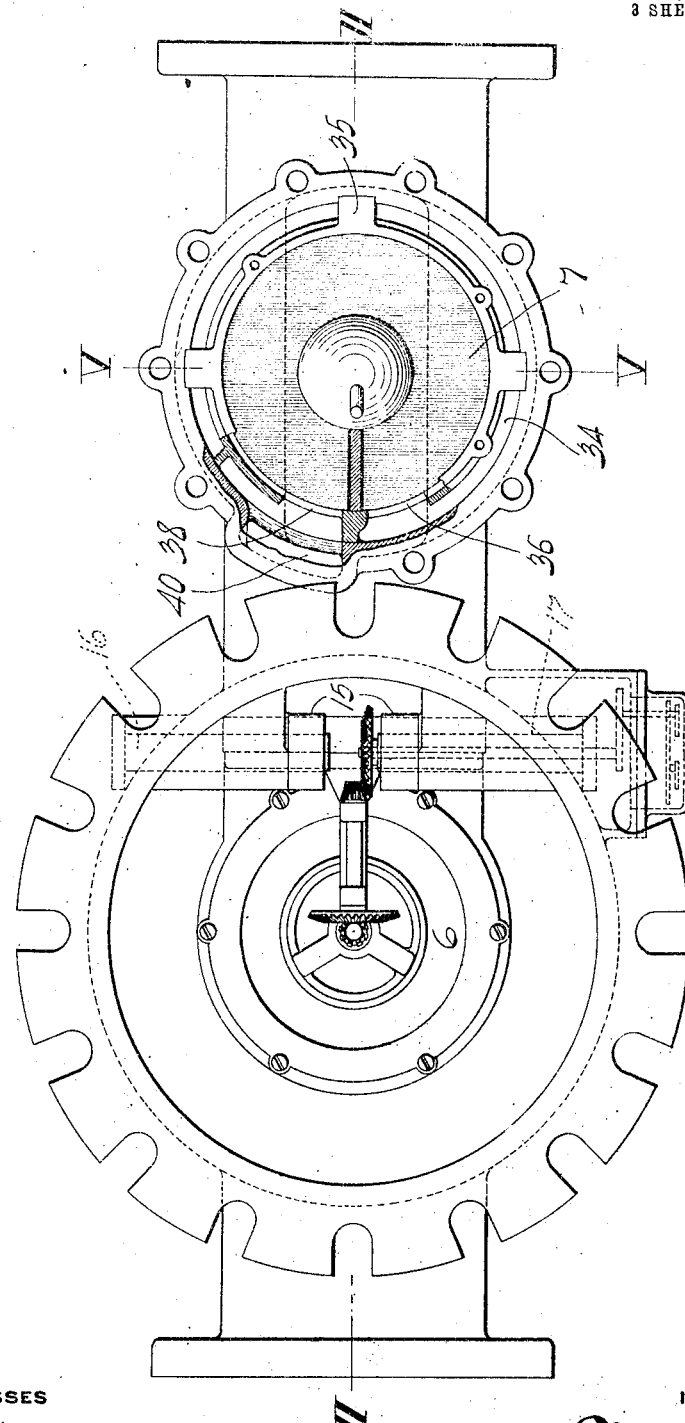
Figure 2:
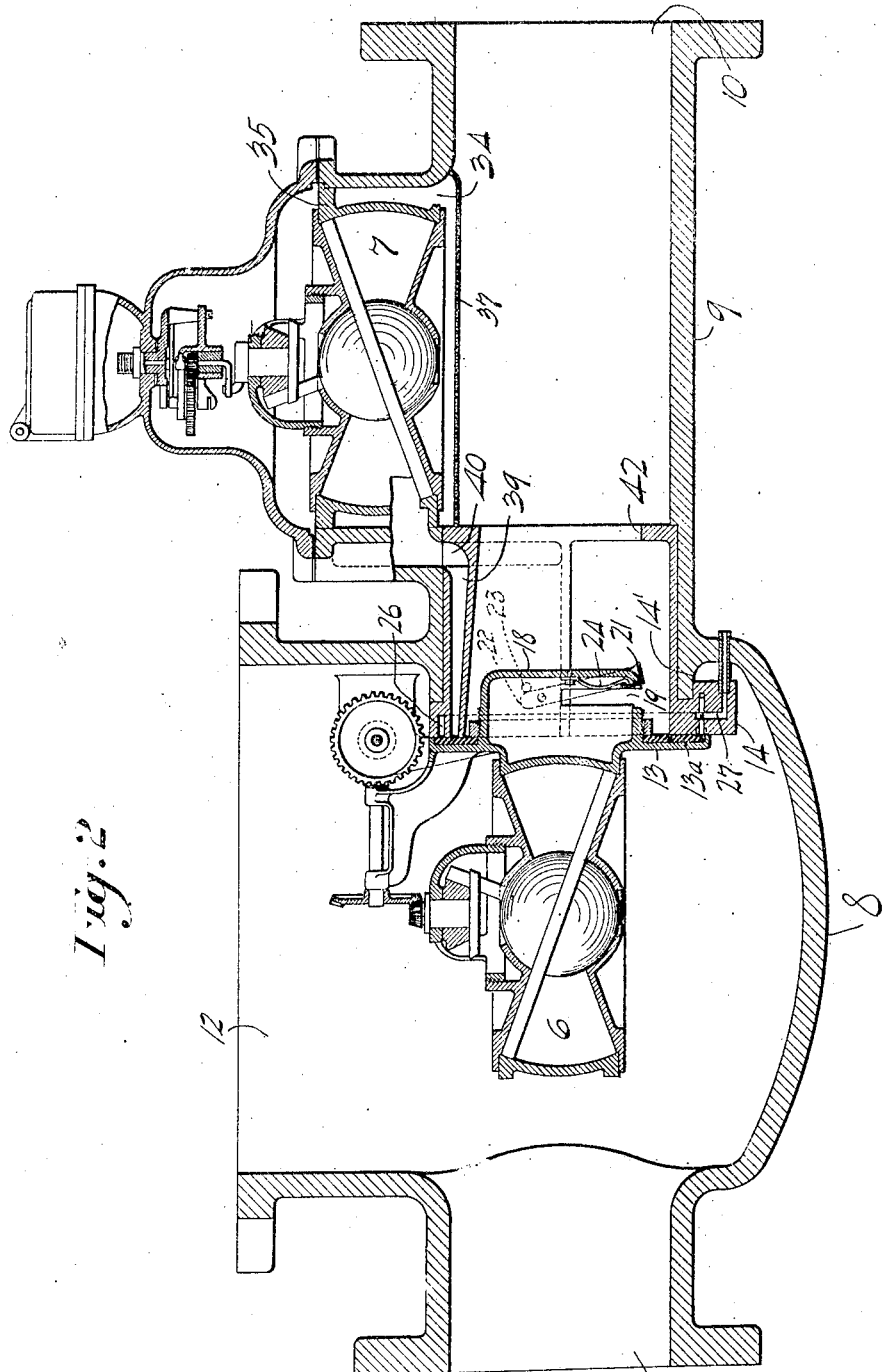
Figure 2 is a section along the line 2—2 of Figure 1; the small flow meter being shown with the cover removed for convenience of illustration.

In the drawings, I have illustrated my invention in connection with a meter system employing a positive registering meter 6 and a proportional meter 7 so arranged that one meter is rendered inoperative, when the other is operating. The positive registering meter 6 is so located that it intercepts the small or normal flows of water and causes them to pass through it. It is also so arranged that it will swing from its normal or operative position to an inoperative position during large or heavy flows and thereby render itself inoperative and the proportional meter operative.

A casing 8 incloses the meter 6 and is provided with a flanged outlet port 11 and a flange 9 terminating in an inlet port 10. The meter 6 is suspended in a chamber 12 located within the casing 8 and is so arranged that it normally shuts off free communication between the chamber 12 and the inlet port 10. The meter shown is of the wabble disk type but it will be apparent that any type of recording meter may be employed.

A disk 13 is shown integrally formed with the casing of the meter 6 and so located that it seats on a sleeve 14 located in the flange 9 and projecting beyond a reëntrant flange 14' into the chamber 12. Lugs 15 are provided on the disk 13 and the meter is suspended by means of them on pins 16 and 17 which are suitably mounted in lugs or brackets formed integrally with the casing 8. An opening is formed through the disk 13 and is covered by a cap 18 which may be formed integrally with the disk and which is so constructed that it forms a shield for the inlet port of the meter 6. The cap 18 is provided with a port 19 which is controlled by an automatically actuated valve 21 and forms a means of communication between the port 10 and the inlet port of the meter. The valve 21 is more or less stirrup shaped, is mounted on the cap 18, and is provided with a finger 22 which is adapted to engage a lug 23 located on the interior of the casing 8, and to move the valve to its open position as the meter 6 swings into its normal position against the sleeve 14. A spring 24 is carried by the cap 18 and operates to move the valve 21 to close the port 19 when the meter moves from its normal position and the finger 22 is moved away from the lug 23.

The outlet port of the meter 6 communicates with the chamber 12 and consequently the water traversing the casing during normal flows is received by the meter 6 from one side of the disk 13 and, after having traversed the meter passages, is discharged into the chamber 12 on the other side of the disk. During normal flows, the pressure in the chamber 12 falls below the pressure in the flange 9 but I have so constructed the disk 13 that the area exposed to the water pressure in the chamber 12 exceeds the area exposed to the water pressure in the flange 9. In addition to this I have also provided means for exposing a portion of the disk 13 to atmospheric pressure and thereby rendering the water pressure in the chamber 12 more effective in holding the meter in the normal position. To this end, I provide a recess 26 in the sleeve 14 and connect it with the atmosphere by means of a passage 27 and a suitable pipe. A gasket 13ᵃ is provided on the disk 13, and is held in place by any suitable means and is adapted to seal the joint between the disk and the sleeve 14, and also to close the recess 26 when the disk is seated on the flange. With this arrangement, the closing pressure exerted on the disk 13 preponderates over the opening pressure to such an extent that quite a drop of pressure may be encountered in the chamber 12 before the water pressure in the flange 9 is sufficient to overcome the closing pressure and to swing the meter about its mounting pins 16 and 17 and provide a substantially unobstructed passage through the casing 8.

I provide a valve in the passage 27 which is so arranged that it establishes communication between the recess 26 and the atmosphere when the meter 6 is in the normal position and shuts off communication between the recess and the atmosphere when the meter is moved to the inoperative position.

The valve shown, consists of a plunger 28, the rear portion of which is of greater diameter than the forward portion and is located in a cylindrical recess 29 provided in the sleeve 14. The recess 29 extends at right angles to the passage 27 and provides, in effect, a cylinder in which the plunger operates as a piston. The forward end of the plunger projects through a bushing 30 which is screwed into a suitably tapped hole in the sleeve and is provided with a transversely extending slot 31 which registers with and forms a part of the recess 26. A passage is provided through the bushing 30 and between it and the plunger 28 by cutting away or otherwise removing a portion of the cylindrical surface of the forward part of the plunger, as shown at 31.

The shoulder formed by the difference in diameter between the forward and the rear portions of the plunger is adapted to seat on the bushing 30; when the disk 13 uncovers the recess 26 and to thereby prevent the leakage of water between the plunger and the bushing and from the chamber 12 through the passage 27. An opening 32 extends longitudinally through the plunger and is adapted to deliver water from the chamber 12 to the cylindrical recess 29 back of the plunger when the disk 3 is raised from the sleeve 14. The water pressure admitted through this opening operates to move the valve to its seat on the bushing. The valve in coming to its seat on the bushing moves the forward end of the plunger beyond the sleeve 14 so that the valve will be unseated and move back to open the passage between the bushing and the plunger and to establish communication between the passage 27 and the recess 26, when the disk 13 seats on the sleeve 14. With such an arrangement, the recess 26 is exposed to atmospheric pressure when the meter 6 is in the operative position and water is prevented from leaking from the chamber 12, when the meter is in the inoperative position. The induction meter 7 is located in a substantially cylindrical off-set formed integrally with the flange 9 and communicating with the interior of the flange. A passage 34 is located between the casing of the meter 7 and the cylindrical wall of the off-set; and extending almost entirely around the meter casing, communicates with an inlet port 36 of the casing. The upper portion of the passage 34 is closed by the mounting flange 35 of the meter casing, while the lower portion is open throughout the greater portion of its length, thus providing free communication between the inlet port 10 of the casing 8 and the inlet port 36 of the meter.

A screen 37 is mounted in any suitable manner on the casing 8 and is located between the meter and the passage formed by the flange 9.

The outlet port 38 of the meter 7 is located adjacent to the inlet port 36 and communicates with a semi-annular passage 39 formed in the sleeve 14, through a short passage 40 formed in the wall of the off-set. The outlet end of the passage 39 is controlled by the disk 13 of the swinging meter 6 and communicates with the chamber 12 when the meter 6 swings to an inoperative position.

The gasket 13ᵃ covers the delivery end of the passage 39 when the meter 6 is in the operative position, and therefore prevents a flow of water through the meter 8; or, in other words, renders the meter 7 inoperative during the operation of the meter 6.

The sleeve 14 is so formed that it decreases the cross-sectional area of the passage through the flange 9 at a point indicated by the numeral 42; and the meter 7 is arranged to record the flow of water traversing it, which is induced by the reduction of pressure caused by the decrease in cross-sectional area of the stream passing through the flange 9. The induced flow through the meter will vary proportionately to the amount of flow through the flange 9 and consequently the entire flow may either be recorded by the meter 7 or be ascertained from the record of the amount of water actually traversing the meter.

The operation of the meter system is as follows:

During small flows, the meter 6 is held in the operative position by the water pressure in the chamber 12, as has been described. The valve 19 is open and the disk 13 is held firmly against the sleeve 14; consequently all the water traversing the casing 8 must pass through the meter 6 and be registered by it. As the demand on the main, in which the casing 8 is located, increases—that is as the valves in the distributing system are opened—the pressure in the chamber 12 decreases until it reaches a determined pressure, such that the water pressure in the flange 9 preponderates and swings the meter 6 out of the operative position and provides a substantially unobstructed passage through the casing. The meter 6 is held in this inoperative position by the force of the flow through the casing. The water traversing the passage 9 under such conditions induces a flow of water through the meter 7 and out through the passage 39, which is proportional to the flow through the casing 8. As the demand for water decreases, the pressure in the chamber 12 increases and the flow decreases; and at some predetermined pressure, or, better, at some determined flow through the inlet 10, the meter moves by its own weight and shuts off direct communication between the inlet port 10 and the chamber 12. As soon as the meter is in the operative position normal pressure conditions are established and it is held in place by the preponderance of water pressure, as described.

Having thus described my invention, what I claim is:

1. The combination of a water main, a water meter in the main normally in the path of the flow and means whereby the same is mounted for swinging movement, said meter being adapted to be temporarily moved out of the path of flow of the water by excessive pressure of such flow, and means for automatically closing the inlet to the meter when it is forced out of the path of flow.

2. In combination with a distributing main, a meter located out of the line of flow through the main and having a port to communicate with the interior of the main, and a movable meter located in the line of flow through the main to receive and measure the same and movable in response to varying flows to uncover the port and permit a portion of the flow in the main to pass through the meter and out through the port.

3. In combination with a distributing main, a proportional meter located out of the line of flow through the main, a positive registering meter movable in response to variations of flows, into and out of the path of flow through the main and means for rendering one of said meters inoperative when the other is operative.

4. In combination with a distributing main, a positive registering meter having an inlet port and an outlet port and movable in response to variations of flows into and out of the path of flow through the main, a valve carried by the movable meter and operated by the movement thereof for closing the port of said movable meter and a meter located out of the line of flow through the main and adapted to receive part of the flow through said main when the movable meter is out of the path of flow.

5. In combination with a distributing main, an induction meter located out of the line of flow through the main and having an outlet port and an inlet port, said meter being adapted to temporarily measure flows, a movable meter in the line of flow in the main for closing the outlet port of said induction meter, and movable in response to variations of flow into and out of the line of flow through the main.

6. In combination with the distributing main, an induction meter located out of the line of flow through said main and having an inlet port and an outlet port, said induction meter being adapted to temporarily measure part of the flow through the main and a suspended meter in the main for closing the outlet port of said induction meter and movable in response to variations of flow through the main to open said outlet port and provide a substantially unobstructive passage through the main.

7. In combination with a distributing main, a meter located out of the line of flow through the main and having an outlet port, a movable meter for closing the outlet port of said first mentioned meter, located in the line of flow through the main and movable in response to variations of flow through the main to open said outlet port and provide a substantially unobstructed passage through the main and a valve for controlling the inlet to said movable meter and movable in response to the motion of said meter.

8. In combination with a ported casing, a meter provided with inlet and outlet ports and located in said casing and movable into and out of the line of flow through said casing, and a valve mounted on and operated by the movement of said meter for closing the inlet port of said meter.

9. In combination with a ported casing, a meter provided with inlet and outlet ports and movable into and out of the line of flow through said casing, a pivoted valve operated by the movement of said meter for controlling the inlet port of the meter.

10. A conduit section provided with a seat encircling the water passage thereof, a pivoted member adapted normally to engage said seat, and including a meter adapted to receive and measure the flow through the conduit section when the pivoted member engages its seat, said pivoted member being adapted to be forced from its seat by, and thus afford an opening for, abnormal flow, and means for automatically closing the inlet to the meter when it is forced out of the path of flow.

11. In combination with a casing provided with an inlet port and an outlet port, a movable meter located within said casing adapted to cover one of said ports, a seat for said meter provided with a recess for exposing a portion of the casing of said meter to atmospheric pressure and a valve for closing communication between the atmosphere and said recess when said meter is moved to uncover said port.

12. The combination with a shell or casing having a passage therethrough, of a valve normally closing said passage and adapted to be opened by an increase in the pressure differential and having a port therein, metering apparatus carried by said valve, and a second valve controlling said port whereby in the opening of the first valve the metering apparatus will be cut out of normal operation.

13. The combination with a shell or casing having a passage therethrough, of a valve normally closing said passage and adapted to be opened by an increase in the pressure differential and having a port therein, said valve being mounted for swinging movement, metering apparatus carried by said valve, and a second valve controlling said port whereby in the swinging movement of the first valve to open position, the metering apparatus will be cut out of normal operation.

14. The combination with a shell or casing having a passage therethrough, of a valve normally closing said passage and adapted to be opened by an increase in the pressure differential due to the fluid and metering apparatus carried by said valve and adapted to operate in the normal flow of the fluid and to be rendered inoperative upon the development of such increase of pressure differential.

15. A metering device for indicating fluid flow comprising in combination a main, a normal flow meter having a port in communication with the main, a proportional flow meter having a port in communication with the main, and means in the main movable into one position to cause the normal flow meter to become operative and cause the proportional flow meter to become inoperative, said means being movable into another position to cause the proportional flow meter to become operative and the normal flow meter to become inoperative.

16. A metering device for indicating fluid flow comprising in combination a main, a normal flow meter having a port in communication with the main, a proportional flow meter having a port in communication with the main, and means in the main movable into one position to cause the normal flow meter to become operative and cause the proportional flow meter to become inoperative, said means being movable into another position to cause the proportional flow meter to become operative and the normal flow meter to become inoperative, said means when moved into said last position permitting an unobstructed flow through the main.

17. A metering device for indicating fluid flow comprising in combination a main, a normal flow meter having a port in communication with the main, a proportional flow meter arranged to permit unobstructed flow through the main and having a port in communication with the main, a means in the main movable into one position to cause the normal flow meter to become operative and to cause the proportional flow meter to become inoperative, said means being movable into another position to cause the proportional flow meter to become operative and the normal flow meter to become inoperative.

In testimony whereof, I have hereunto subscribed my name this 25th day of August, 1910.

HORACE CHRISMAN.

Witnesses:
C. W. McGhee,
E. M. McCallister.